United States Patent Office
2,792,425
Patented May 14, 1957

2,792,425

PRODUCTION OF HYDROPEROXIDES USING MALONIC ESTERS AS OXIDATION INITIATORS

William E. Weesner, Dayton, Ohio, assignor to Monsanto Chemical Company, St. Louis, Mo., a corporation of Delaware No Drawing. Application October 14, 1954,
Serial No. 462,362

16 Claims. (Cl. 260—610)

This invention relates to the oxidation of hydrocarbons, and to certain initiators or accelerators therefor. The invention in some of its aspects pertains to the production of the hydroperoxides of cumene and other aliphatic-aromatic hydrocarbons including the homologues of cumene. It has especial reference to the production of cumene hydroperoxide, ethylbenzene hydroperoxide, diphenylmethane hydroperoxide and the like.

It is known that the hydroperoxides of various hydrocarbons can be prepared by passing oxygen or an oxygen-containing gas through the hydrocarbon in the liquid phase at elevated temperature. The reaction is very slow and passes through an initial induction period during which the absorption of oxygen is practically nil; it is only after the formation of a certain amount of hydroperoxide that the reaction velocity reaches a suitable rate. It is also known that this induction period can be eliminated or, at least, reduced by introducing into the reaction mixture at the commencement an initiator consisting of a hydroperoxide which can be, for example, the hydroperoxide of the hydrocarbon to be oxidized.

It is an object of the present invention to provide a new and unexpectedly useful class of accelerators or initiators for use in the aforesaid process.

According to the present invention, a process for the production of hydroperoxides of hydrocarbons comprises subjecting the parent hydrocarbon in the liquid phase to treatment with oxygen at elevated temperature in the presence of an ester of malonic acid or an ester of a substituted malonic acid as initiator.

The invention is broadly applicable to the oxidation of hydrocarbons and substituted hydrocarbons, including non-aromatic compounds such as isobutane, cyclohexane, methyl cyclopentane, and the like. However, the process of the invention is particularly applicable to aromatic hydrocarbons with at least one alkyl, aralkyl or cycloalkyl group or a fused hydrogenated cyclic nucleus, and to such hydrocarbons substituted with non-interfering non-hydrocarbon atoms or radicals. Preferred are those aromatic hydrocarbons of the type just described, wherein said group or said nucleus is non-primary, i. e., has a secondary or tertiary carbon atom to which the hydroperoxide radical can be attached. An example of an alkyl aromatic hydrocarbon with a primary carbon atom is toluene. An example of an alkyl aromatic hydrocarbon with a secondary carbon atom is ethylbenzene. Among the hydrocarbons with a tertiary carbon atom, the most important is possibly cumene, the hydroperoxide of which has gained a considerable industrial importance by reason of the facility with which it can be decomposed into phenol and acetone. Secondary butyl benzene and aromatic hydrocarbons containing several alkyl groups, such as p-cymene and the diisopropyl benzenes may also be cited. Diphenylmethane is an example of a suitable aralkyl aromatic hydrocarbon. Cyclohexylbenzene, also termed phenyl cyclohexane, is an example of a suitable cycloalkyl aromatic hydrocarbon. The aromatic hydrocarbons with a fused hydrogenated nucleus are represented for example by tetrahydronaphthalene. Aromatic hydrocarbons substituted with a non-hydrocarbon radical are represented for example by m-chlorocumene.

It has been suggested that β-ketonic esters be employed as initiators for hydrocarbon oxidation, see U. S. Patent No. 2,674,629. The conclusion to be drawn from said patent is that an ester group is an essential component of the initiator, and that it must have a keto group beta thereto.

The present invention concerns the use of a different class of compounds as initiators for hydrocarbon oxidation. The invention in its broadest aspects contemplates the use of malonic esters as oxidation initiators, i. e., esters of malonic acid or of substituted malonic acids. It is preferred that the malonic esters of the present invention have at least one hydrogen atom on the carbon atom joining the two ester (i. e., carboalkoxy) groups. The preferred group of compounds employed in the invention are represented by the structural formula

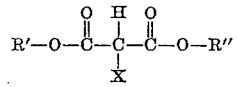

In the foregoing formula: R' is a hydrocarbon or substituted hydrocarbon radical; R" is a hydrocarbon or substituted hydrocarbon radical; X is a non-interfering radical as hereinafter defined, especially hydrogen, a hydrocarbon radical, a substituted hydrocarbon radical, or a hydrocarbon or substituted hydrocarbon radical joined with R' to form a ring. It is preferred that the hydrocarbon or substituted hydrocarbon radicals in question contain from 1 to 8 carbon atoms. The hydrocarbon or substituted hydrocarbon radicals in question can be aliphatic, alicyclic, aromatic or combinations thereof such as aralkyl, alkaryl, and the like, and can be saturated or unsaturated. Those stated to be substituted can be substituted with any radical that is non-interfering with the desired oxidation and the initiation thereof. Examples of permissible non-interfering radicals are: halogen, e. g., chlorine, bromine; nitro; alkoxy; acyl, e. g., acetyl, benzoyl; heterocyclics such as furyl. The term "substituted hydrocarbon radical" is inclusive of such radicals as furyl, tetrahydrofuryl, thenyl, and the like where oxygen, sulfur, or other hetero atom is substituted in a ring. By way of example of specific compounds that can be employed as initiators in the practice of the present invention, there are mentioned:

Diethyl malonate
Methyl ethyl malonate
Diethyl(isobutyl)malonate
Diethyl(allyl)malonate
Di-t-butyl(chloro)malonate
Di-β-chloroethyl malonate
Diphenyl malonate
2-carbethoxy-5-hydroxypentanoic acid lactone
α-Carbomethoxy-γ-butyrolactone
Di-n-octyl malonate
Di-i-propyl(methoxy)malonate
Dibenzyl(methyl)malonate
Difurfuryl malonate
Di-m-nitrophenyl malonate
Dicyclohexyl malonate Suitable combinations of particular malonic ester, hydrocarbon to be oxidized, oxygen-containing gas, temperature, pressure, reaction time, etc. will readily be chosen by those skilled in the art, having been given the benefit of the present disclosure. The quantities of initiator to be used may vary within fairly wide limits. Only small amounts are needed, such as less than 5 percent and usually 2 percent and less, on down to quantities which in some cases can be as low as 0.1 to 0.35 weight percent, based on weight of hydrocarbon to be oxidized. The temperature of oxidation will depend considerably on the particular hydrocarbon to be oxidized. While temperatures of from 50 to 100° C. in many instances cause oxidation, it is usually preferred to use higher temperatures, such as 120 to 200° C. The higher the temperature, the shorter the reaction time permissible. In most cases a maximum hydroperoxide content can be built up in the reaction mixture, and if the reaction is prolonged beyond that point rapid decomposition of hydroperoxide may occur. In any event, some byproducts such as ketones, alcohols, etc., are apt to be formed.

In many instances superior results are obtained if a basic additive is present in the hydrocarbon. Suitable additives will not necessarily be the same for different hydrocarbons. Thus, while sodium hydroxide can be used in some instances, it is not suitable in the oxidation of ethylbenzene. On the other hand, sodium bicarbonate, calcium carbonate, and the like can be employed in most instances. Amounts of from 1 to 10 weight percent of the basic additive, based on the weight of hydrocarbon to be oxidized, are usually adequate.

Since water is an oxidation product, and since it in some cases tends to decompose the hydroperoxide product, it will sometimes help to remove the water as fast as it is formed, as by continuously distilling it out of the reaction mixture or by chemically binding it with a material such as calcium oxide.

The oxidation is effected with free molecular oxygen. While pure oxygen is quite suitable and in some instances is most economical, it is often permissible to employ gases containing oxygen concentrations of less than 100 percent, for example air, or other mixtures of oxygen with inert gases.

The oxidations can be advantageously effected at atmospheric, sub-atmospheric, or superatmospheric pressures. Pressures of from 50 to 500 pounds per square inch are often helpful. In any event, adequate means should be provided for obtaining intimate admixture of oxygen with hydrocarbon. It will be recognized that caution should be taken to avoid oxygen-hydrocarbon vapor mixtures within the explosive limits for a particular oxygen-containing gas and hydrocarbon. This can be accomplished by means that will be obvious to those skilled in the art, for example, by diluting the effluent gases with steam, by maintaining a liquid-full reactor, etc.

When metallic catalysts, such as cobalt naphthenate, iron salts, and the like are present, the oxidation proceeds to the formation of ketones, alcohols and acids, and hydroperoxide is not produced.

The following examples are provided, showing some of the benefits obtainable from the use of the invention. Examples are also given of oxidations attempted without the use of the present initiators. It will be understood that variations can be made from the exact hydrocarbon, initiator, other additives, temperature, pressure and other conditions of the examples without departing from the invention in its broadest aspects.

*Example 1*

This example described the results of attempted oxidation of ethylbenzene with pure oxygen in the absence of any added materials. In this example, and in the other examples, the liquid ethylbenzene was placed in a glass vessel, and pure oxygen was introduced below the surface of the liquid and near a mechanical stirring device which insured rapid and intimate admixture of the oxygen gas with the ethylbenzene. The vessel was maintained at atmospheric pressure. It was provided with a thermometer in the liquid reaction mixture, and a reflux condenser through which effluent gases were removed.

Redistilled ethylbenzene in the amount of 100 grams was placed in the reactor, and warmed to 124° C. At that time a steady flow of oxygen was initiated. During the run, the temperature was maintained between 120 and 125° C.

Quantitative determinations of the content of ethylbenzene hydroperoxide (more accurately named α-methylbenzyl hydroperoxide, or methylphenylhydroperoxymethane) were made by iodometric titration.

After one hour's reaction time, a sample of the liquid reaction mixture was taken and analyzed for hydroperoxide. No hydroperoxide was present. A similar sample was taken at 3 hours, and again no hydroperoxide was present. The same negative result was obtained at 4 hours. In other words, after 4 hours intimate contact of ethylbenzene with oxygen at 120–125° C. no hydroperoxide has been formed.

*Example 2*

Since considerable work on the oxidation of ethylbenzene had demonstrated that the presence of a basic additive such as sodium bicarbonate is very desirable in permitting the production and maintenance of ethylbenzene hydroperoxide in the reaction mixture, at conditions otherwise suitable for the production of the hydroperoxide, the following run was made.

Into the apparatus described in Example 1, was placed 100 grams of redistilled ethylbenzene together with 3.4 grams of sodium bicarbonate. Again, the temperature was maintained at 120–125° C. Samples were taken at 1, 2, and 5 hours after the start of the contacting of the ethylbenzene plus sodium bicarbonate with oxygen. In no case was any hydroperoxide found.

*Example 3*

This run was made in the same manner as described for Examples 1 and 2.

Into a reactor which essentially duplicated that described above, was placed 100 grams of redistilled ethylbenzene, 3.4 grams of sodium bicarbonate, and 2.0 grams of diethyl malonate. Temperature was maintained at 120° C. Samples were taken at intervals and analyzed for hydroperoxide. Results are as follows:

| Time, Hours | Wt. Percent Ethylbenzene Hydroperoxide in Reaction Mixture |
| --- | --- |
| 1 | 2.1 |
| 2 | 2.9 |
| 6.7 | 8.0 |

The data of this example show clearly the initiating effect of the diethyl malonate on the oxidation of ethylbenzene to form ethylbenzene hydroperoxide.

*Example 4*

This run was made in the same manner and in the same apparatus as in Example 3.

Into the reactor was placed 100 grams of redistilled ethylbenzene, 3.4 grams of sodium bicarbonate and 2.0 grams of diethyl(isobutyl)malonate. The temperature was maintained at 120° C. during the run. Samples were taken at intervals and analyzed for hydroperoxide content, with the following results:

| Time, Hours | Wt. Percent Ethylbenzene Hydroperoxide in Reaction Mixture |
| --- | --- |
| 3.5 | 3.8 |
| 6 | 5.5 |

The data of this example show clearly the initiating effect of the diethyl ester of the isobutyl-substituted malonic acid on the oxidation of ethylbenzene to form ethylene hydroperoxide.

While the invention has been described herein with particular reference to various preferred embodiments, and examples have been given of suitable proportions and conditions, it will be appreciated that variations from the exact details given herein can be effected without departing from the invention.

I claim:

1. A process for the production of hydroperoxides of hydrocarbons which comprises subjecting the parent hydrocarbon in liquid phase to treatment with oxygen at elevated temperature in the presence of a malonic ester.

2. Process according to claim 1 wherein said malonic ester is a dialkyl malonate.

3. Process according to claim 1 wherein said malonic ester is employed in an amount not over 5 weight percent based on said parent hydrocarbon.

4. A process for the production of hydroperoxides of hydrocarbons which comprises subjecting the parent hydrocarbon in liquid phase to treatment with oxygen at elevated temperature in the presence of a malonic ester having the general formula

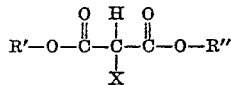

wherein R' is selected from the group consisting of hydrocarbon and substituted hydrocarbon radicals, R'' is selected from the group consisting of hydrocarbon and substituted hydrocarbon radicals, and X is selected from the group consisting of hydrogen, hydrocarbon radicals, substituted hydrocarbon radicals, and hydrocarbon and substituted hydrocarbon radicals joined with R' to form a ring.

5. Process according to claim 4 wherein said hydrocarbon is ethylbenzene.

6. Process according to claim 4 wherein said hydrocarbon is cumene.

7. A process according to claim 4 wherein said parent hydrocarbon is an aromatic hydrocarbon containing a substituent in the form of a member of the class consisting of alkyl, aralkyl, cycloalkyl, and a hydrogenated cyclic nucleus fused thereto.

8. A process according to claim 7 wherein said substituent of said aromatic hydrocarbon has a secondary carbon atom adjacent to the aromatic hydrocarbon nucleus.

9. A process according to claim 7 wherein said substituent of said aromatic hydrocarbon has a tertiary carbon atom adjacent to the aromatic hydrocarbon nucleus.

10. In the oxidation of hydrocarbons by contact with oxygen at elevated temperatures, the improvement which comprises employing as initiator for said oxidation a malonic ester.

11. Process according to claim 10 wherein said malonic ester is diethyl malonate.

12. Process according to claim 10 wherein said malonic ester is diethyl(isobutyl)malonate.

13. A process for the production of ethylbenzene hydroperoxide which comprises subjecting ethylbenzene in liquid phase to treatment with oxygen at elevated temperature in the presence of a small amount of diethyl malonate effective to initiate said production of ethylbenzene hydroperoxide.

14. A process for the production of ethylbenzene hydroperoxide which comprises subjecting ethylbenzene in liquid phase to treatment with oxygen at elevated temperature in the presence of a small amount of diethyl(isobutyl)malonate effective to initiate said production of ethylbenzene hydroperoxide.

15. In a process for the peroxidation of an aromatic hydrocarbon substituted by a hydrocarbon radical having a carbon atom in one of the states secondary and tertiary and to which a hydroperoxide function can be attached in which the hydrocarbon is subjected in the liquid phase to treatment with oxygen at elevated temperature, the step which consists in conducting the reaction in the presence of a minor proportion of a malonic ester having the general formula

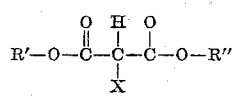

wherein R' is selected from the group consisting of hydrocarbon and substituted hydrocarbon radicals, R'' is selected from the group consisting of hydrocarbon and substituted hydrocarbon radicals, and X is selected from the group consisting of hydrogen, hydrocarbon radicals, substituted hydrocarbon radicals, and hydrocarbon and substituted hydrocarbon radicals joined with R' to form a ring.

16. A process for the production of ethylbenzene hydroperoxide which comprises subjecting ethylbenzene in liquid phase, in the absence of a metal salt oxidation catalyst and in the presence of an alkaline material favorable to hydroperoxide production, to treatment with oxygen at elevated temperature in the presence of a small amount of diethyl malonate effective to initiate said production of ethylbenzene hydroperoxide.

References Cited in the file of this patent

UNITED STATES PATENTS 2,674,629        Scriabine _____ Apr. 6, 1954